United States Patent [19]

Pedersen

[11] Patent Number: 5,175,962
[45] Date of Patent: Jan. 5, 1993

[54] METHOD OF AND APPARATUS FOR MACHINING SPUR AND HELICAL GEARS

[75] Inventor: Harry Pedersen, Penfield, N.Y.

[73] Assignee: The Gleason Works, Rochester, N.Y.

[21] Appl. No.: 755,400

[22] Filed: Sep. 5, 1991

[51] Int. Cl.⁵ .............................................. B24B 49/00
[52] U.S. Cl. .............................. 51/165.71; 51/165.76;
51/287; 51/52 R; 409/26; 409/51
[58] Field of Search ............... 51/165.71, 165.76, 287,
51/DIG. 1, 52 R, 52 HB, 956 H, 105 GG;
409/26, 51

[56] References Cited

U.S. PATENT DOCUMENTS

| | | | |
|---|---|---|---|
| 1,759,333 | 5/1930 | Wildhaber . | |
| 3,110,135 | 11/1963 | Berlinsky . | |
| 4,037,365 | 7/1977 | Cole | 51/97 R |
| 4,559,744 | 12/1985 | Wirz | 51/287 |
| 4,630,404 | 12/1986 | Erhard et al. | 51/287 |
| 4,635,404 | 1/1987 | Wirz | 51/287 |
| 4,650,378 | 3/1987 | Zubler | 409/12 |
| 4,697,387 | 10/1987 | Wirz | 51/287 |
| 4,981,402 | 1/1991 | Krenzer et al. | 409/29 |
| 5,044,127 | 9/1991 | Ryan | 51/287 |

FOREIGN PATENT DOCUMENTS

| | | |
|---|---|---|
| 2516059 | 10/1976 | Fed. Rep. of Germany . |
| 8910726 | 1/1991 | Fed. Rep. of Germany . |
| 373624 | 1/1964 | Switzerland . |
| 2145186 | 3/1985 | United Kingdom . |

OTHER PUBLICATIONS

Fragin et al., "New Method of Finishing Teeth of Hardened Spur Gears", *Vestnik Mashinostroeniya*, vol. 55, Issue 7, 1975, pp. 39-42.

Primary Examiner—M. Rachuba
Attorney, Agent, or Firm—Robert L. McDowell; Ralph E. Harper

[57] ABSTRACT

Disclosed herein is a process and apparatus for grinding tooth surfaces of spur and helical gears by a generating method. The outer tooth surfaces of a theoretical ring gear are conjugate to the grinding surfaces along the width of a generally hourglass shaped grinding wheel. The grinding wheel is rotated which in turn causes the theoretical ring gear to rotate. A work gear is rotated in mesh with the internal tooth surfaces of the theoretical ring gear and simultaneously is traveresed in mesh across the width of the grinding wheel with the center of the work gear moving in a path about the center of the theoretical ring gear.

25 Claims, 7 Drawing Sheets

METHOD OF AND APPARATUS FOR MACHINING SPUR AND HELICAL GEARS

FIELD OF THE INVENTION

The present invention is directed to the machining of gears, particularly spur and helical gears, by a generating process utilizing a tool having a generally hourglass shape along the width thereof.

BACKGROUND OF THE INVENTION

Machining of spur and helical gears by processes utilizing grinding wheels of the type commonly referred to as globoidal, hyperboloidal or hourglass, have been known in the art for some time.

A process for producing crowned gear teeth by linearly moving a work gear relative to the concave edge of a grinding wheel having a helical groove is disclosed by U.S. Pat. No. 3,110,135 to Berlinsky. In this process, the work gear must be moved at an angle across the edge of the grinding wheel in order to produce straight or convex tooth forms having crowned shapes. The angular movement requires a special mechanism on the grinding machine which inherently complicates the machine and process. Moving the work gear straight across the edge of the grinding wheel produces an unusable concave tooth form and no crowning.

German Patent Application 25 16 059 describes a plunge process wherein a hyperboloidal or globoidal grinding worm is utilized for grinding spur and helical gears. The grinding wheel axis and work gear axis are crossed, that is, the projections of the axes into a plane that is parallel to both axes intersect at an angle of less than ninety degrees. This type of axes orientation enables the effective area of the tool to extend from one side face of the work gear to the other so that only a radial change in the distance between the axes is needed for machining. In other words, additional movement of the work gear along its axis to ensure complete machining of the tooth length is not required and the only motion needed is the plunge feed of the grinding wheel relative to the work gear. However, due to stock allowances on the work gear teeth, the tool and work gear surfaces will engage long before the operational center distance is reached. Some portions of the grinding wheel thread will engage the work gear for a longer period of the feed sequence than others and also remove more material. These portions of the grinding wheel will wear faster and cause profile shape problems. Also in this type of "full thread" process, grinding forces would be very high due to the amount of contact between the grinding wheel and the work gear. The process itself is not capable of grinding some gears. The tooth surfaces of the grinding wheel would bind with the work gear before the operational center distance is reached thereby causing operating portions of the gear profiles to be removed.

The method described by Fragin et al. in "New Method of Finishing Teeth of Hardened Spur Gears", (*Vestnik Mashinostroeniva*, Volume 55, Issue 7, 1975), sets forth a plunge-type honing process. One flank of each of the work gear teeth is machined by meshing a revolving globoidal abrasive worm with the one flank, the abrasive thread being narrower than the finished tooth gap. The necessary honing force is created by braking the work gear. Simultaneous with the rotation of the grinding worm and work gear, the work gear is given a reciprocating motion along its axis in order that the machining is complete along the entire tooth length. The opposite flank of each of the work gear teeth is machined by reversing the rotation of the grinding worm. Accurate control of the braking force and reciprocating motion is complex and, therefore, constant production of an acceptable gear is difficult.

Another plunge-type process is disclosed by U.S. Pat. No. 4,559,744 to Wirz. In this process a grinding worm is provided with a thread thickness smaller than the finished tooth gap dimension of the work gear. The grinding worm and work gear are rotated at a revolution ratio corresponding to the number of teeth of the grinding worm and work gear. The grinding worm is then fed relative to the work gear until a desired distance is reached between the axes of the grinding worm and work gear with no contact occurring. At this point the threads of the grinding worm are located between adjacent tooth flanks of the work gear teeth. The grinding worm or work gear is then given an additional rotating movement which is superimposed on the basic rotation thereby enabling a first flank of each of the work gear teeth to be machined. The other flank of each of the teeth is machined by providing an additional rotating movement in a direction opposite that provided for machining the first flank.

A process similar to that of U.S. Pat. No. 4,559,744 is described in U.S. Pat. No. 4,650,378 to Zubler. In this process, after the tool and work gear are radially moved to the desired center distance, at least one of the tool and work gear are moved in a direction perpendicular to the direction of radial movement in order to machine a first flank of each of the work gear teeth. The other flank of each of the work gear teeth is machined by moving in a direction opposite to the direction required for machining the first flank.

The latter two processes, like that of Fragin et al. discussed above, are very complex in that control of the additional rotational motion, or, motion in the plane perpendicular to the radial direction, is difficult to accurately implement and monitor. Also, it is known in plunge-type processes that the fewer the number of teeth on a work gear, the smaller the face width capable of being machined. Furthermore, only one size work gear can be machined with each particular grinding wheel tooth form. A change in size of work gear necessitates that the grinding wheel be dressed with a dressing tool having the same size as the desired work gear.

It is an object of the present invention to provide a method of and machine for machining spur and helical gears wherein the deficiencies of the prior art are eliminated and a wider range of gear sizes are capable of being machined.

It is another object of the present invention to provide a method and machine wherein a plurality of gear sizes can be machined with a single grinding tool.

It is yet another object of the present invention to provide an improved method of dressing a grinding tool having a generally hourglass shape along the width thereof.

SUMMARY OF THE INVENTION

The present invention is directed to a machine and process for machining workpieces utilizing a tool having a generally hourglass shape along the width thereof and at least one stock removing surface arranged and spaced along the tool width.

In particular, the present invention is directed to a method and apparatus for grinding spur and helical gears by a generating process utilizing a grinding wheel having an axis of rotation, a width extending in the axial direction of the grinding wheel and a generally hourglass shape along the width. The grinding wheel has at least one stock removing surface generally helically arranged and extending along the width of the grinding wheel. The stock removing surface is conjugate along the width of the grinding wheel with the outer tooth surfaces of a theoretical ring gear.

The process includes rotating the grinding wheel about its axis which in turn causes a theoretical ring gear to rotate about its axis. A work gear is rotated about its axis and brought into mesh with the internal tooth surfaces of the rotating theoretical ring gear. Simultaneously with rotating in mesh with the theoretical ring gear, the work gear is traversed in mesh relatively across the width of the grinding wheel in a plane substantially perpendicular to the axis of rotation of the work gear. The present invention enables usable, nonconcave tooth surfaces to be formed on the work gear.

The method of the present invention may be computer controlled and carried out on a machine having a plurality of computer controlled axes for positioning and operatively engaging a tool with a work gear. The method comprises computing rotational speeds and initial positions of the tool and the work gear in response to setup parameters input to the machine whereby the rotation of the tool is synchronized with the rotation of the work gear as though both were rotating in mesh with a rotating theoretical ring gear. Rotating the tool about its axis of rotation and rotating the work gear about its axis of rotation. Moving the computer controlled axes to the initial setup positions for initially positioning the tool and the work gear with respect to each other. Computing further operating positions of the axes in response to operating parameters input to the machine. Moving the computer controlled axes to the further operating positions for operatively engaging the rotating tool and the rotating work gear in a manner as though the tool and work gear were in mesh with the theoretical ring gear rotating about an axis of rotation extending through the center thereof. Moving the computer controlled axes to the further operating positions includes, substantially simultaneously with the rotation, moving the computer controlled axes to traverse the work gear in mesh along a path relatively across the width of the tool in a plane perpendicular to the axis of rotation of the work gear. The steps of computing further operating positions and moving the computer controlled axes to the further operating positions are repeated for completing the machining operation.

The present process allows a range of work gears to be machined with a single grinding wheel and permits gears having larger face widths to be machined. Another advantage of the present process is that any instant, the area of engagement between the work gear and grinding wheel is relatively small which means that forces acting on the machine are also small. In fact, at any instant, contact between the work gear and grinding wheel is instantaneous point contact which generates less heat and provides better coolant access. The inventive process also allows a greater portion of the width of the grinding wheel to be utilized in the grinding process.

The present invention also includes a method of dressing a grinding wheel having a generally hourglass shape along the width thereof. The dressing is similar to the grinding process except for minor dimensional changes in the geometry of the dressing tool compared to the geometry of the desired work gear.

The dressing method of the present invention has the advantages, like those of grinding, of point contact between the dressing tool and grinding wheel whereby forces on the machine are reduced, less heat is generated and coolant access is improved. Also, the dressing tool can be made smaller than the work gear thus reducing the costs of dressing and easing the difficult task of diamond plating the dressing tool since fewer numbers of teeth result in a greater included angle between the sides of a tooth space.

DETAILED DESCRIPTION OF THE PREFERRED EMBODIMENTS

The present invention will now be discussed with reference to the accompanying Drawings which represent the invention by way of example only.

Figure 1:
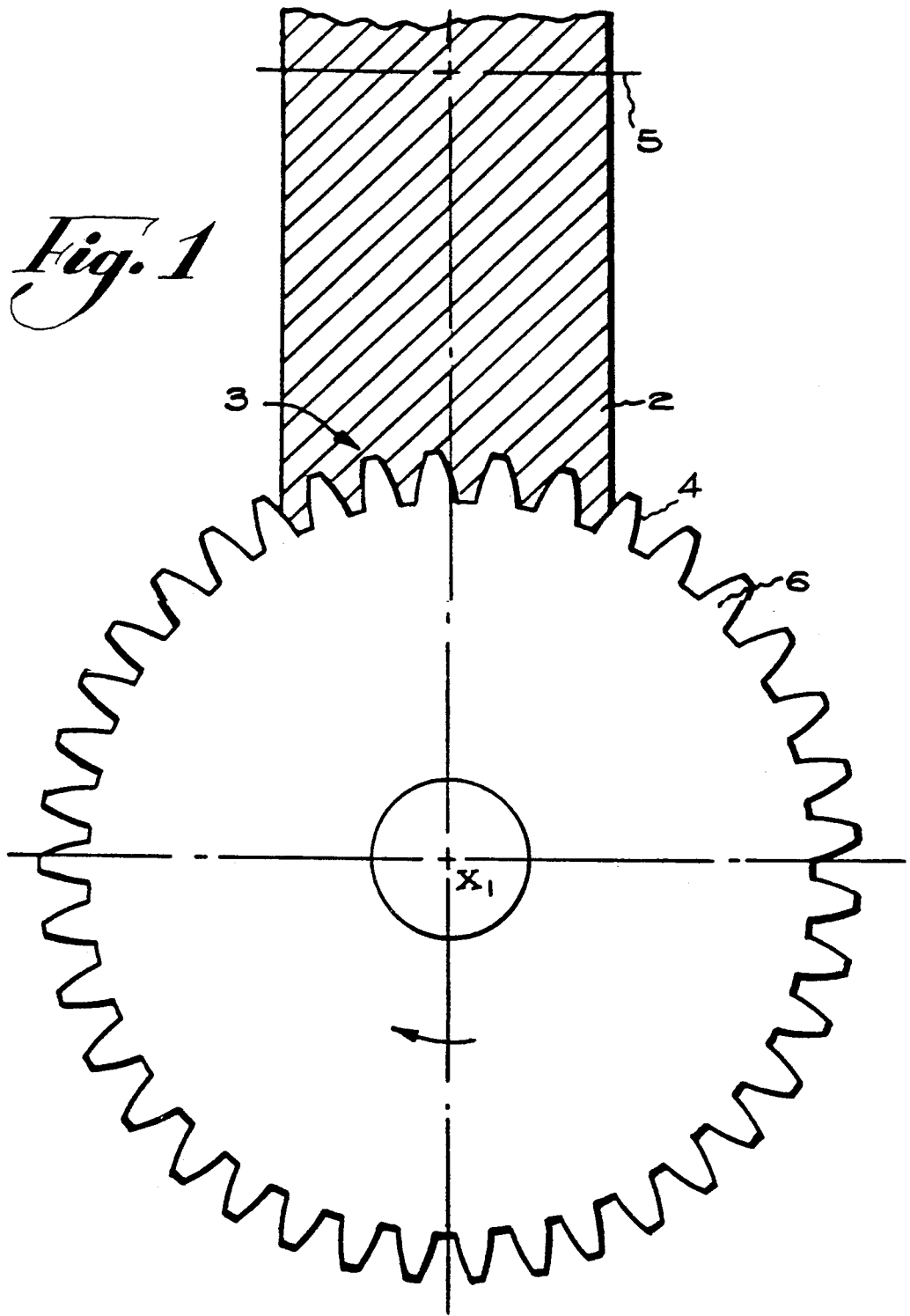
FIG. 1 illustrates a theoretical ring gear in mesh with a grinding wheel having a generally hourglass shape along the width thereof.

FIG. 1 illustrates a stock removing tool such as a grinding wheel 2 having an axis of rotation 5 and a width extending in the axial direction of the grinding wheel. The grinding wheel 2 comprises a generally hourglass shape along its width and is made of a suitable abrasive material such as aluminum oxide or cubic boron nitride (CBN). Although the present specification discusses the invention with references to grinding, it is to be understood that the principles of the present invention are also applicable to other types of stock removal, such as cutting or honing, utilizing a tool having a generally hourglass shape along its width. The grinding wheel 2 has a diameter and at least one stock removing surface 3 generally helically arranged around the periphery thereof and extending along its width. The grinding wheel 2 is conjugate along its entire width with the outer tooth surfaces 4 of a theoretical ring gear 6 having an axis of rotation passing through its center, $X_j$. Since the theoretical ring gear 6 is conjugate along the entire width of the grinding wheel 2 it therefore represents the largest diameter gear that can mesh with the grinding wheel 2.

Figure 2:
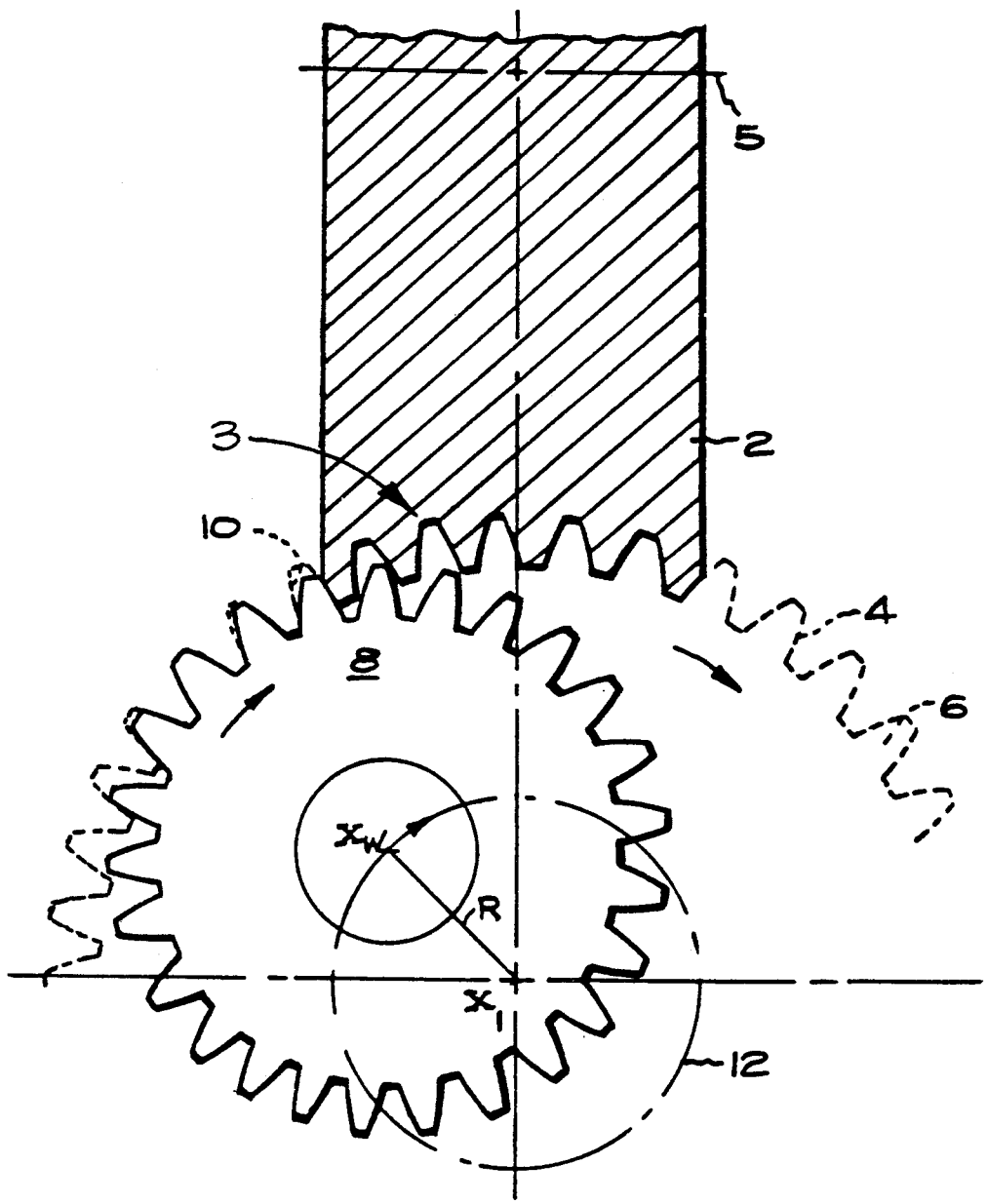
FIG. 2 illustrates a work gear in mesh with a theoretical ring gear prior to engagement with a grinding wheel.

In FIG. 2 a work gear 8 having an axis of rotation passing through its center, $X_W$, is shown at a position relative to the grinding wheel 2 just prior to its engagement with the grinding wheel 2. The axis 5 of the grinding wheel 2 and the axis 14 of the work gear 8 are oriented in a what is known as a crossed-axis arrangement wherein the angle between the axes 5 and 14, known as the machine helix angle, is less than ninety degrees. The amount less than ninety degrees is dependent primarily upon the helix angle of the work gear 8 and the helix angle of the stock removing surface on the grinding wheel 2. In the position shown in FIG. 2 there is no contact between the work gear 8 and grinding wheel 2 even though the center line of the theoretical gear 6 is at the manufacturing center distance relative to the grinding wheel axis. An advantage of the present process is that any work gear having a diameter smaller than the theoretical ring gear 6 and capable of meshing with the internal tooth surfaces 10 of the theoretical ring gear 6 can be machined by the process of the present invention. The grinding wheel 2 is rotated at a desired speed which in turn causes the theoretical ring gear 6 to rotate at a speed dependent upon the rotational speed of the grinding wheel 2. The work gear 8 is then rotated and positioned as though it were in mesh with the rotating theoretical ring gear 6. Thus, the theoretical ring gear 6 is in mesh with both the work gear 8 and the grinding wheel 2. Since the diameter of the work gear 8 is smaller than that of the theoretical ring gear 6, the rotational speed of the work gear 8 will necessarily be greater than the speed of the theoretical ring gear 6. It is to be noted that although the rotations of the theoretical ring gear 6 and the work gear 8 are shown to be in a clockwise direction, the present invention is not limited to a particular direction of rotation. A particular direction of rotation is shown for reference purposes only.

Figure 3:
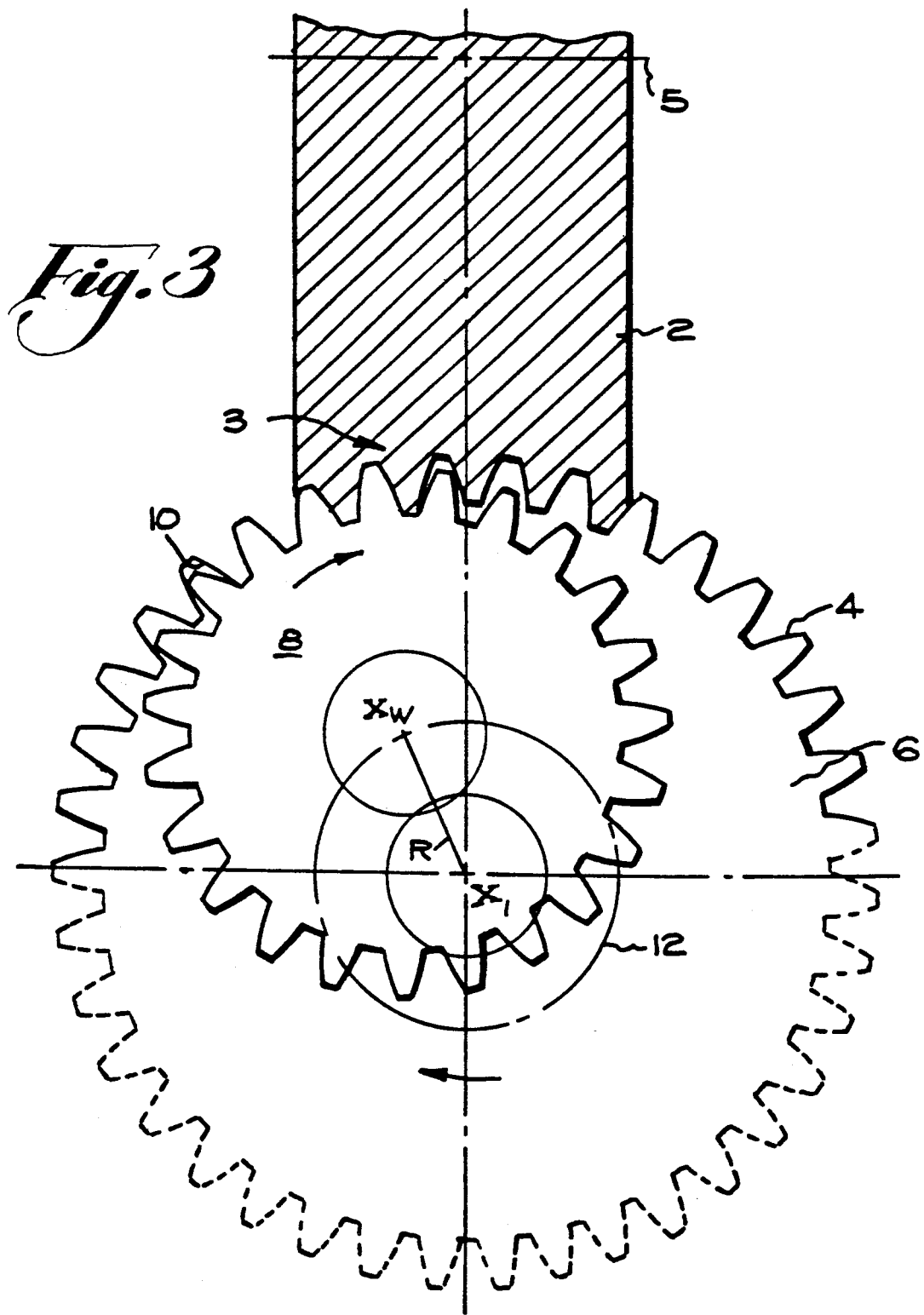
FIG. 3 illustrates the position of the work gear relative to the grinding wheel and theoretical ring gear at the beginning of the grinding process according to the present invention.

Once in mesh with the rotating theoretical ring gear 6, the rotating work gear 8, substantially simultaneously with its rotation, is traversed relatively across the width of the grinding wheel 2. FIG. 3 shows the position of the work gear 2 at the beginning of the grinding process. The traversal is necessary since, at the position shown in FIG. 3, only limited tooth surface contact will occur between the work gear 8 and grinding wheel 2 in this position. The work gear 8 meshes with the grinding wheel 2 as it is traversed in a plane substantially perpendicular to the axis of rotation of the work gear 8. The path of traversal is controlled by moving the center of the work gear, $X_W$, in a path about the center, $X_I$, of the theoretical ring gear 6. The path taken by the work gear 8 may be circular such as shown by FIG. 3 wherein the work gear center, $X_W$, moves about the center, $X_I$, of the theoretical ring gear 6 at a constant radius, R. However, the path of the work gear need not be limited to circular movement.

Figure 4:
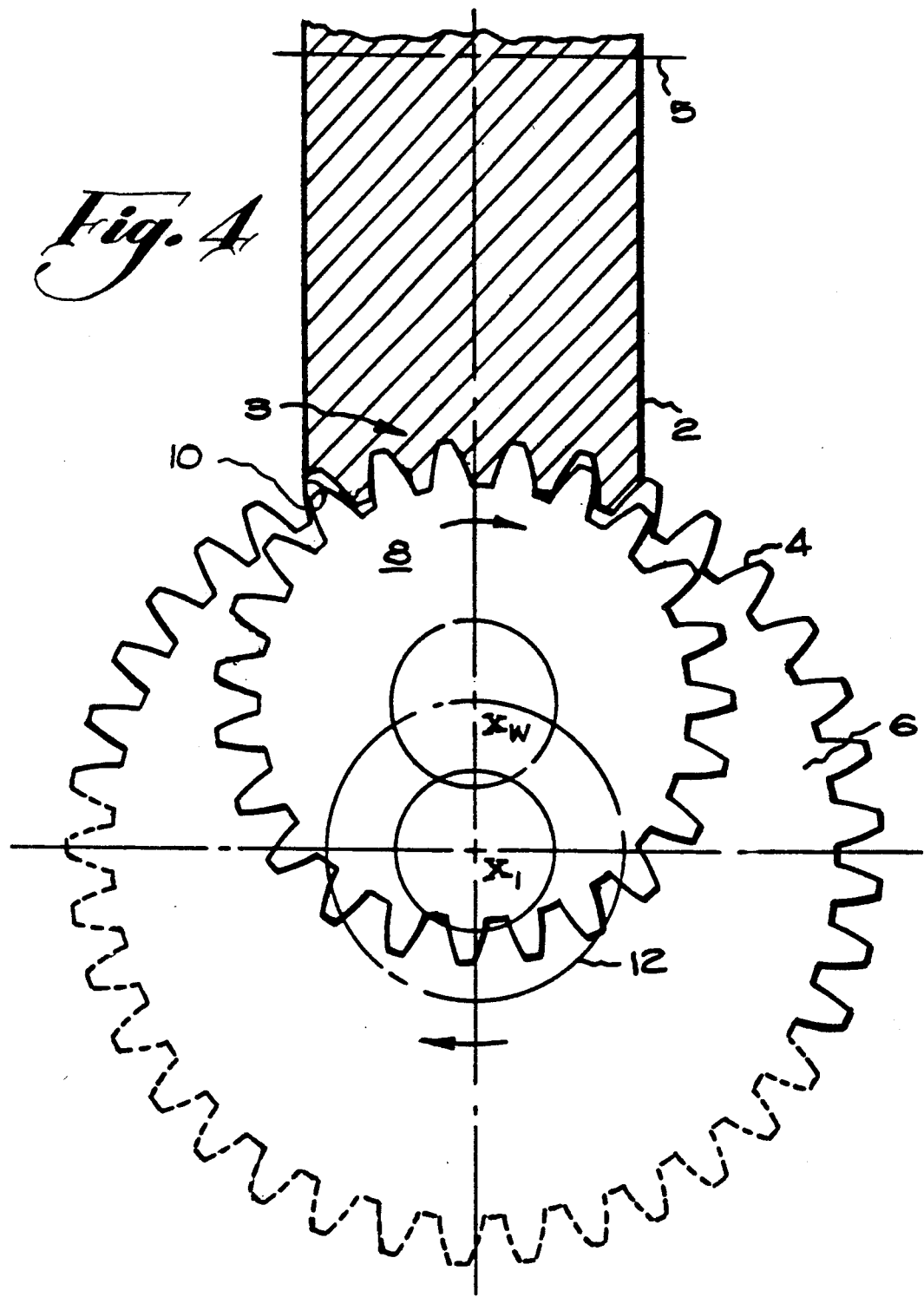
FIG. 4 illustrates the position of the work gear relative to the grinding wheel and theoretical ring gear at about the midpoint of the grinding process according to the present invention.
Figure 5:
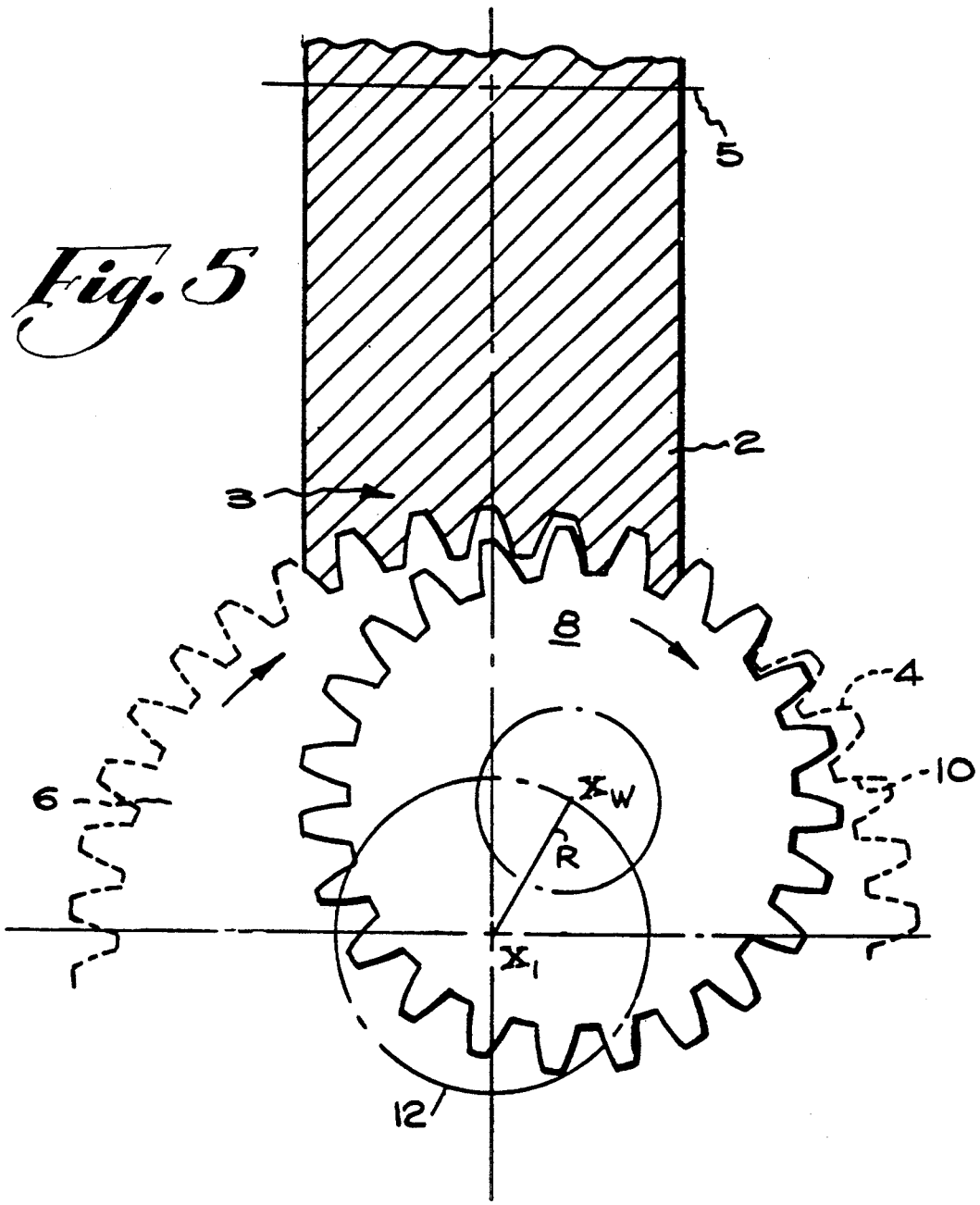
FIG. 5 illustrates the position of the work gear relative to the grinding wheel and theoretical ring gear near the end of the grinding process according to the present invention.

FIGS. 4 and 5 show, respectively, the positions of the work gear 8 as it is traversed relatively across the width of the grinding wheel 2 at about the midpoint of the grinding process and near the completion of the grinding process. In the course of moving in this manner, the tooth surfaces of the work gear 8 are brought into conjugacy with the portions of the theoretical ring gear 6 that engage the grinding wheel 2. The machining action that would otherwise be done on the theoretical ring gear 6 is done instead on the work gear 8. Once the work gear 8 has traversed the width of the grinding wheel 2 the process is complete, all tooth surfaces have been machined. The inventive process has the advantage in that, at any instant, the area of engagement between the work gear 8 and grinding wheel 2 is relatively small. This means that the forces acting on the machine system are also small.

The rotation of the work gear 8 and the movement of its center, $X_W$, about the center, $X_I$, of the theoretical ring gear 6 may be accomplished by mechanical means. This mechanical arrangement, however, permits the machine system to produce only a single gear specification. A preferred embodiment is to utilize a pair of computer numerically controlled (CNC) slides that can move the center of a work gear along any circular or noncircular path about the center of a theoretical ring gear. A given grinding wheel shape can be used to grind a range of gears each of which is smaller than the theoretical ring gear and internally conjugate with the theoretical ring gear. For each work gear, the center, $X_W$, is moved along an appropriate path while at the same time the work gear is rotated as if engaged with the theoretical ring gear. The CNC approach has the added advantage that tooth surface modifications can be introduced by varying the shape of the path along which the work gear center, $X_W$, moves and/or varying the rotation of the work gear relative to the grinding wheel.

Figure 6:
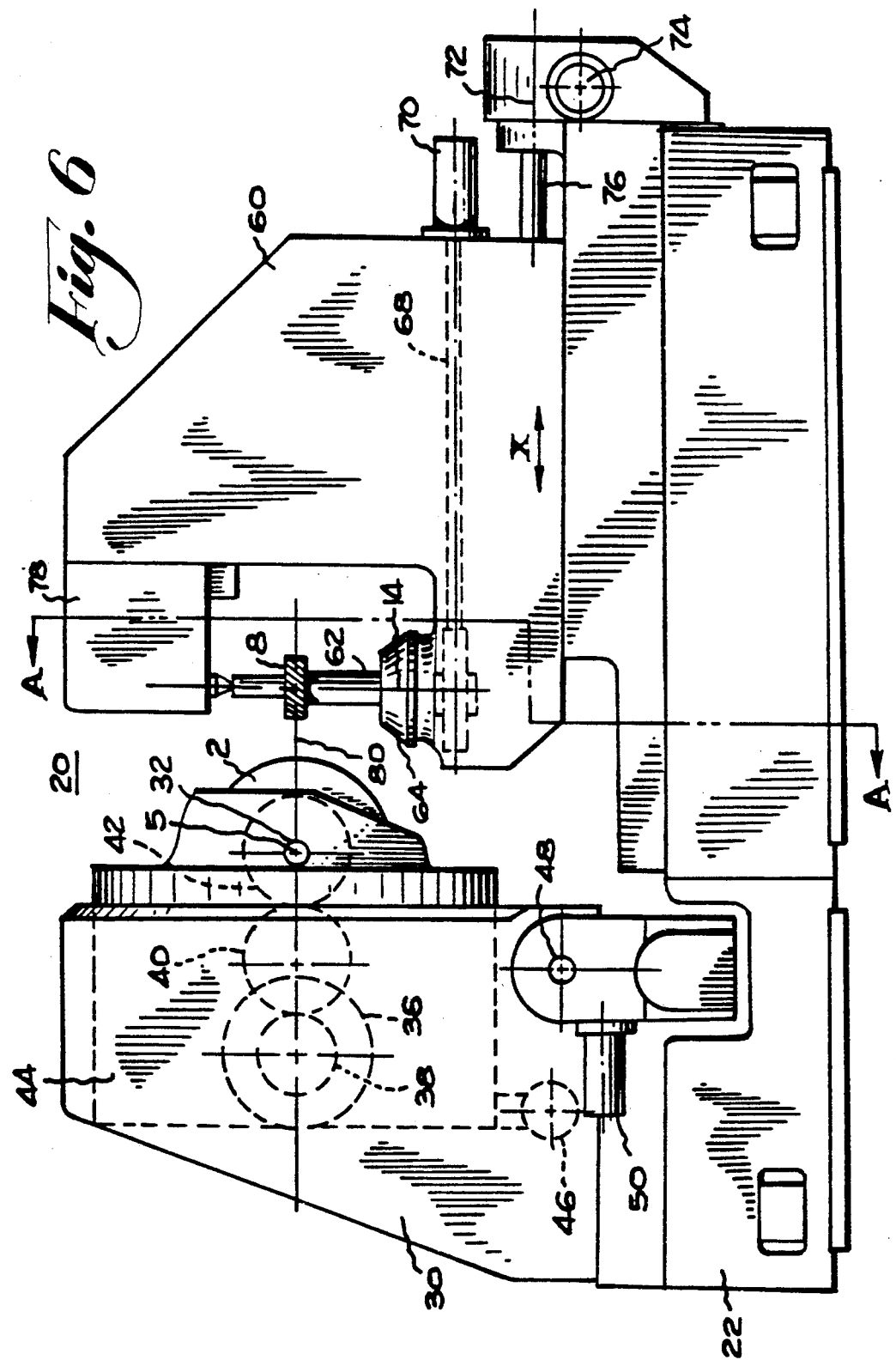
FIG. 6 schematically illustrates an inventive machine for carrying out the grinding process according to the present invention.

An apparatus for carrying out the inventive process is schematically shown by FIG. 6. Apparatus 20 comprises a machine base 22, tool housing 30 and work spindle housing 60. Tool housing 30 includes hourglass-shaped grinding wheel 2 mounted to a spindle 32 and rotatable about grinding wheel axis 5. Wheel spindle drive motor 36 is connected to the grinding wheel spindle 32 by a series of wheel spindle drive gears 38, 40 and 42. Grinding wheel 2 and its associated drive components, namely spindle 32, drive motor 36 and drive gears 38, 40 and 42 are contained in a rotatable drum 44. Drum 44 is rotated by a servo motor 46 for setting the desired machine helix angle required for the particular gear being machined. Tool housing 30 is linearly movable by way of slides (not shown) along axis 48 (Y-axis) parallel to machine base 22 by a servo motor 50 connected to tool housing 30 by a suitable arrangement 52 such as a ball screw.

Work spindle housing 60 comprises a work holding means 62, such as an arbor, for mounting work gear 8 such that it is rotatable about its axis of rotation 14. Work holding means 62 is connected to work spindle 64 which is in turn connected, by appropriate means 68, to work spindle servo motor 70 for rotating the work gear 8. Work spindle housing 60 is also linearly movable, by way of slides, parallel to machine base 22 along axis 72 (X-axis) by servo motor 74 connected to work spindle housing 60 by a suitable arrangement such as a ball screw.

Axes 48 (Y-axis) and 72 (X-axis) are arranged perpendicular to each other. It can be seen that the direction of movement of the tool housing 30 and work spindle housing 60 could be reversed, that is, tool housing 30 could move in the X direction and work spindle housing 60 could move in the Y direction. Also, either the tool housing 30 or the work spindle housing 60 could move in both X and Y directions.

Figure 7:
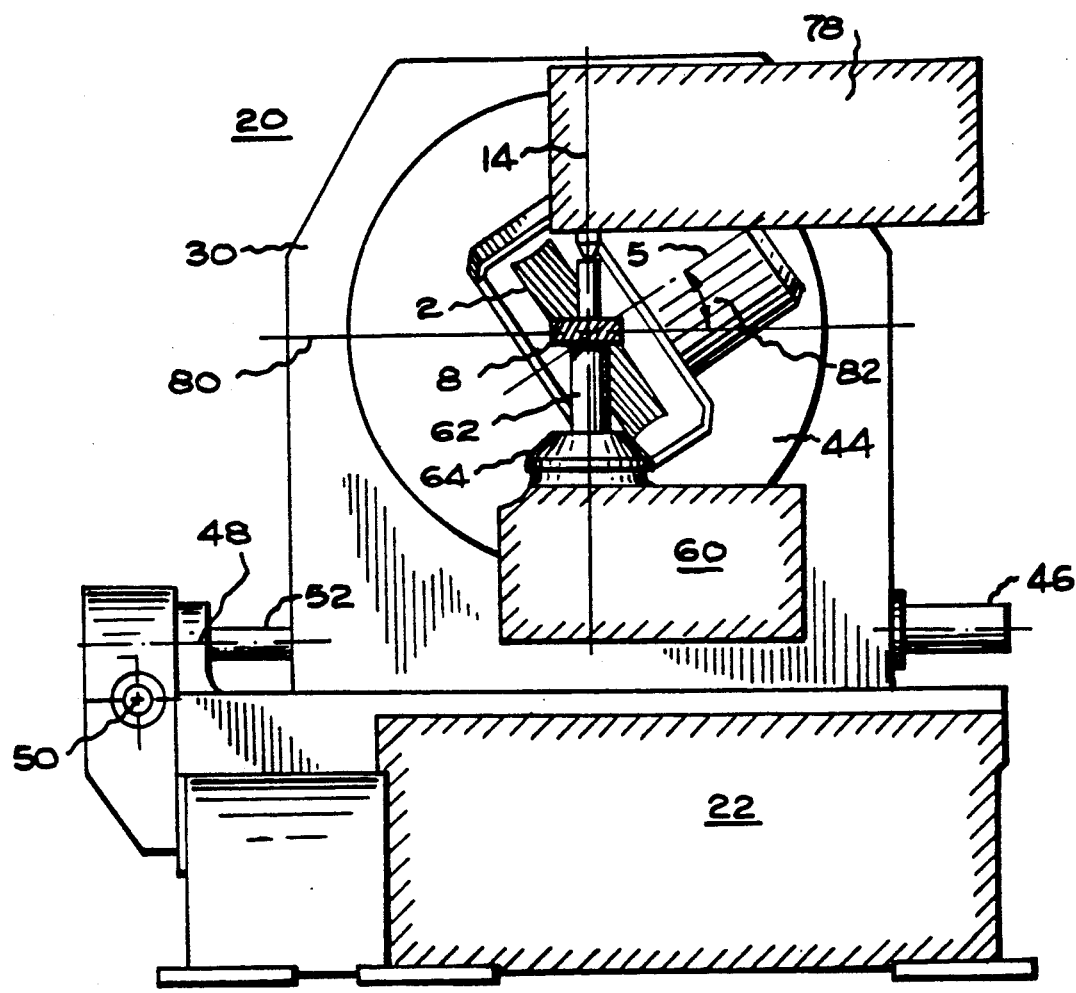
FIG. 7 schematically illustrates an alternative view of the grinding machine of the present invention taken along line A—A of FIG. 6.

FIG. 7 illustrates an alternative view of the present inventive apparatus taken along line A—A of FIG. 6. It can be seen that the grinding wheel 2 has been set at a desired machine helix angle 82 for machining work gear 8. The machine helix angle 82 being the angle between the grinding wheel axis 5 and the plane 80 perpendicular to the axis of rotation 14 of work gear 8. The traversal of work gear 8 across the width of grinding wheel 2 takes place within the plane 80.

Each of the respective drive motors, 36, 46, 50, 70 and 74 is associated with either a linear or rotary encoder (not shown) as part of a CNC system which governs the operation of the drive motors in accordance with instructions input to a computer (not shown). The encoders provide feedback information to the computer concerning the actual positions of each of the movable machine axes.

In operation, the work spindle housing 60 is moved back along the X-axis 72 to a retracted position for loading and unloading the work gear 8. The work gear 8 may be loaded and unloaded manually or automatically. After the work gear 8 is mounted on the work holding means 62 and clamped by movement of the tailstock 78, the work spindle 64 is brought into the required rotational synchronization with the rotation of the grinding wheel 2. Also, by some external means, the work gear 8 is brought to a rotational location such that the teeth of the work gear 8 will centrally engage the spaces between the threads of the grinding wheel 2. This location procedure is known as stock dividing and is well known in the art. The tool housing 30 and the work spindle housing 60 are brought to a position whereby the axis of the work gear 8 is at the beginning of the path 12 that the work gear axis 14 must follow relative to the center, $X_j$, of the theoretical ring gear 6. See FIG. 2. The X and Y axes, 72 and 48, then move in concert to carry the work gear 8 through the zone of engagement relative to the grinding wheel 2. Both sides of the work gear teeth are machined during this engagement. The work spindle housing 60 then retracts to the load/unload position. The tool housing 30 may move to some convenient position in preparation for the next grinding cycle.

The grinding wheel 2 of the present invention may be dressed by a dressing tool having essentially the same specifications as the desired work gear 8. The dressing tool differs only in the addendum and dedendum dimensions. The dressing tool may have the same number of teeth as the work gear or it may have fewer or greater numbers of teeth. However many teeth, the dressing tool must be capable of meshing with the internal tooth surfaces of the theoretical ring gear. Regardless of the number of teeth, the specifications must be essentially the same as the work gear, that is, the module, pressure angle and helix angle of the dressing tool must be the same as the work gear. The addendum is somewhat longer in order that the root portions of the grinding wheel 2 are cut deep enough in dressing that during subsequent grinding, the root portions of the grinding wheel do not contact the toplands of the work gear. The dedendum is formed somewhat shorter in order that the root portions of the dressing tool remove stock from the toplands of the grinding wheel thread such that during subsequent grinding, the toplands of the threads of the grinding wheel do not grind the root portions of the work gear.

The dressing process is carried out in the same manner as the grinding process with the dressing tool rotating about its axis and traversing across the width of the grinding wheel 2 in a plane perpendicular to the axis of the dressing tool as though both were engaged with the theoretical ring gear 6. The path followed by the center of the dressing tool may also be CNC controlled. Tooth surface variations on the work gear may be introduced by varying, during machining, from the circular path of the center of the work gear moving about the center of the theoretical ring gear. Tooth surface variations on the work gear may also be introduced by varying, during dressing, from the circular path of the center of the dressing tool moving about the center of the theoretical ring gear. The latter approach results in the particular variation being included directly on the grinding surface which is subsequently formed on the work gear without the need for moving the work gear along a path other than the circular path.

The surface that is dressed onto the thread or threads of the grinding wheel 2 is such that the profile of the thread or threads is continually changing along the width of the grinding wheel 2. That is, the thread profile as seen in any axial cross-section is unique. As the dressing tool rotates and traverses across the grinding wheel 2, there is point-to-point contact between the teeth of the dressing tool and the threads of the grinding wheel which, at any instant, are at different and unique contact positions as the dressing tool rotates and traverses across the grinding wheel 2. This type of contact generates a continually changing profile surface on the threads in a direction along the helically arranged stock removing surface of the grinding wheel 2. When the dressed grinding wheel contacts a rotating and traversing work gear, the surface dressed onto the grinding wheel produces a surface on the teeth of the work gear that is conjugate to the internal surface on the theoretical ring gear. The contact between the grinding wheel and the work gear is also point-to-point contact. This type of contact, when compared to the line contact of the prior art, results in a smaller grinding area that generates less heat and provides better coolant access.

After each dressing operation there is a slight change in the helix angle of the grinding wheel. Therefore, the angle between the work gear and grinding wheel must be accordingly adjusted to account for this change in the grinding wheel helix angle. This adjustment is accomplished by rotatably adjusting drum 44 thereby adjusting the machine helix angle.

The dressing method of the present invention has the advantage that the cost of the dressing tool can be reduced. The dressing tool can be made smaller than the workpiece and, therefore, there are fewer teeth that require diamond plating and corrective grinding. It is easier to diamond plate the tooth surfaces of a gear with a small number of teeth than a gear with a large number. This is due to the greater included angle between the sides of a tooth space. In the prior art, where the dressing tool is the same size and has the same number of teeth as the work gear, it is extremely difficult to achieve adequate diamond grain deposition on the lower flanks of the dressing tools. It is especially difficult on gears with low pressure angles.

Another advantage to the dressing process of the present invention is that dressing forces are significantly reduced because of the smaller area of engagement between the dressing tool and the grinding wheel. The rigidity between the two will therefore be increased and the errors caused by deflections will be reduced.

The present inventive grinding process is not limited, as in the prior art plunge-type processes, to decreasing the face width capable of being machined on a work gear as the number of teeth decrease on a work gear. The present process also allows a greater portion of the grinding wheel to be utilized during grinding. This is primarily due to the circumferential direction of feeding the work gear into the grinding wheel in contrast to the radial feed direction of the prior art methods.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A method of machining spur and helical gears, said method being a generating method and comprising the steps of:
    providing a stock removing tool having an axis of rotation, a width extending in the axial direction of said stock removing tool and a generally hourglass shape along said width with at least one thread-like stock removing surface generally helically arranged and extending along said width, said at least one thread comprising a plurality of revolutions about said stock removing tool, said stock removing tool being conjugate along the width thereof with the tooth surfaces of a theoretical ring gear, said theoretical ring gear having a diameter and an axis of rotation passing through the center, $X_I$,
    providing a work gear having tooth surfaces and a diameter less than the diameter of said theoretical ring gear, the tooth surfaces of said work gear being internally conjugate with said tooth surfaces of said theoretical ring gear, said work gear having a center, $X_W$, and an axis of rotation passing through said center,
    rotating said work gear about its axis of rotation,
    rotating said stock removing tool about its axis of rotation, said theoretical ring gear rotating in mesh with said stock removing tool,
    engaging said stock removing tool and said work gear, said center, $X_W$, of said work gear being located a distance spaced from said center, $X_I$, of said theoretical ring gear,
    traversing said work gear in mesh relatively across said stock removing tool along said width thereof, said traversing being in a plane substantially perpendicular to said axis of rotation of said work gear, said traversing comprising rotating said work gear in mesh with the internal tooth surfaces of said theoretical ring gear and simultaneously moving said center, $X_W$, of said work gear along a path about the center, $X_I$, of said theoretical ring gear at said distance spaced therefrom, said tooth surfaces of said work gear remaining in mesh with said tooth surfaces of said theoretical ring gear as said work gear traverses relatively across said stock removing tool.

2. The method of claim 1 wherein said at least one thread-like stock removing surface simultaneously removes stock material from opposite sides of adjacent teeth of said work gear.

3. The method of claim 1 wherein said path about said center of said theoretical ring gear is a substantially circular path.

4. The method of claim 1 wherein said stock removing tool is a grinding wheel.

5. A method of grinding spur and helical gears having non-concave longitudinal tooth curvature, said method comprising:
    providing a grinding wheel having an axis of rotation, a width extending in the axial direction of said grinding wheel and a diameter, said grinding wheel being of a generally hourglass shape along said width and having at least one grinding surface generally helically arranged and extending along said width of said grinding wheel, said at least one grinding surface being conjugate along the entirety of said width with the tooth surfaces of a theoretical ring gear,
    providing a work gear having an axis of rotation and a diameter less than the diameter of said theoretical ring gear,
    rotating said work gear about its axis of rotation,
    rotating said grinding wheel about its axis of rotation, said theoretical ring gear rotating in mesh with said grinding wheel,
    traversing said rotating work gear relatively across said width of said grinding wheel in a plane substantially perpendicular to said axis of rotation of said work gear, said traversing comprising rotating said work gear at a speed whereby it meshes with the internal tooth surfaces of said rotating theoretical ring gear and simultaneously moving said work gear along a path about the center of said theoretical ring gear whereby said work gear relatively traverses in mesh with said at least one grinding surface across said width of said grinding wheel.

6. The method of claim 5 wherein said path about said center of said theoretical ring gear is a substantially circular path.

7. A method of grinding spur and helical gears, said method comprising:
    providing a grinding wheel having an axis of rotation, a width extending in the axial direction of said grinding wheel and a diameter, said grinding wheel being of a generally hourglass shape along said width and having at least one grinding surface generally helically arranged about and extending along said width of said grinding wheel, said grinding surface having a continually changing profile shape in a direction along said generally helically arranged grinding surface, said at least one grinding surface being conjugate along the entirety of said width with the tooth surfaces of a theoretical ring gear,
    providing a work gear having an axis of rotation and a diameter less than the diameter of said theoretical ring gear,
    rotating said work gear about its axis of rotation,
    rotating said grinding wheel about its axis of rotation, said theoretical ring gear rotating in mesh with said grinding wheel,
    traversing said rotating work gear relatively across said width of said grinding wheel, said traversing comprising rotating said work gear at a speed whereby it meshes with the internal tooth surfaces of said rotating theoretical ring gear and simultaneously moving said work gear along a path about the center of said theoretical ring gear whereby said work gear traverses in mesh with said at least one grinding surface relatively across said width of said grinding wheel.

8. The method of claim 7 wherein said path about said center of said theoretical ring gear is a substantially circular path.

9. A method of dressing a grinding wheel for grinding desired tooth surfaces on spur and helical gears, said grinding wheel having an axis of rotation, a width extending in the axial direction of said grinding wheel and a diameter, said grinding wheel having a generally hourglass shape along said width with at least one grinding surface generally helically arranged and extending along said width, said method comprising the steps of:
- providing a dressing tool having an axis of rotation and a plurality of tooth surfaces, said dressing tool having essentially the same specifications as a desired work gear and comprising a coating of hard abrasive material on said tooth surfaces,
- rotating said dressing tool about its axis of rotation,
- rotating said grinding wheel about its axis of rotation, said theoretical ring gear rotating in mesh with said grinding wheel,
- traversing said rotating dressing tool relatively across said width of said grinding wheel in a plane substantially perpendicular to said axis of rotation of said dressing tool, said traversing comprising rotating said dressing tool at a speed whereby it meshes with the internal tooth surfaces of said rotating theoretical ring gear and simultaneously moving said dressing tool along a path about the center of said theoretical ring gear whereby said dressing tool traverses in mesh with said at least one grinding surface relatively across said width of said grinding wheel.

10. The method of claim 9 wherein said dressing tool comprises the same specifications as said desired work gear with the exception that said dressing tool includes a smaller dedendum dimension and a larger addendum dimension than said desired work gear.

11. The method of claim 9 wherein said path about said center of said theoretical ring gear is a substantially circular path.

12. The method of claim 9 wherein said dressing tool comprises a different number of teeth than said desired work gear.

13. The method of claim 12 wherein said dressing tool comprises fewer teeth than said desired work gear.

14. An apparatus for machining the tooth surfaces of spur and helical gears, said apparatus comprising:
- a machine base,
- a tool housing located on said machine base, said tool housing comprising a stock removing tool rotatable about an axis, said stock removing tool having width extending in the axial direction thereof, said stock removing tool having generally hourglass shape along said width and comprising at least one stock removing surface generally helically arranged and extending along said width, said stock removing tool being releasably secured in a rotatable drum in said tool housing, said rotatable drum being rotatably adjustable for setting the machine helix angle of said stock removing tool,
- a work spindle housing located on said machine base, said work spindle housing comprising work holding means for rotatably mounting at least one workpiece thereon for rotation about its axis of rotation,
- means for simultaneously moving said tool housing and said work spindle housing relative to one another in mutually perpendicular directions (X,Y) whereby said at least one workpiece is traversed along a predetermined path relatively across said generally hourglass shape of said stock removing tool in a plane substantially perpendicular to the axis of rotation of said at least one workpiece.

15. The apparatus of claim 14 wherein said path is a circular path.

16. The apparatus of claim 14 wherein at least said means for simultaneously moving are computer numerically controlled.

17. The apparatus of claim 16 further including the rotations of said stock removing tool, said at least one workpiece and said drum being computer numerically controlled.

18. The apparatus of claim 14 wherein said means for simultaneously moving comprise slides and ball screws.

19. The apparatus of claim 14 wherein said tool housing is movable in one of said perpendicular directions and said work spindle housing is movable in the other of said perpendicular directions.

20. The apparatus of claim 14 wherein one of said tool housing and said work spindle housing is movable in both of said perpendicular directions.

21. A method of machining spur and helical gears with a computer controlled machine, said machine having a plurality of computer controlled axes for positioning and operatively engaging a tool with a work gear each having an axis of rotation extending through the center thereof, said tool having a width extending in the axial direction of said tool and comprising a generally hourglass shape along the width thereof and having at least one stock removing surface generally helically arranged and extending along said width, said method comprising:
- computing rotational speeds and positions of said tool and said work gear in response to setup parameters input to said machine whereby the rotation of said tool is synchronized with the rotation of said work gear as though both were rotating in mesh with a rotating theoretical ring gear,
- rotating said tool about its axis of rotation,
- rotating said work gear about its axis of rotation,
- moving said computer controlled axes to said initial setup positions for initially positioning said tool and said work gear with respect to each other,
- computing further operating positions of said axes in response to operating parameters input to said machine,
- moving said computer controlled axes to said further operating positions for operatively engaging said rotating tool and said rotating work gear in a manner as though said tool and work gear were in mesh with said theoretical ring gear rotating about an axis of rotation extending through the center thereof,
- wherein said moving to said computer controlled axes to said further operating positions includes, substantially simultaneously with said rotation of said tool and said work gear, moving said computer controlled axes to traverse said work gear in mesh along a path relatively across the width of said tool in a plane perpendicular to the axis of rotation of said work gear, and,
- repeating said steps of computing further operating positions and moving said computer controlled axes to said further operating positions for completing the machining operation.

22. The method of claim 21 wherein said moving said computer controlled axes to traverse comprises moving said axes whereby said center of said work gear moves about said center of said theoretical ring gear.

23. A method of grinding the tooth surfaces of spur and helical gears, said method comprising:
   (a) providing a machine having:
      a machine base,
      a tool housing located on said machine base, said tool housing comprising a stock removing tool rotatable about an axis, said stock removing tool having a width extending in the axial direction and a generally hourglass shape along the width thereof, said tool comprising at least one stock removing surface generally helically arranged and extending along said width, said stock removing tool being releasably secured in a rotatable drum in said tool housing, said rotatable drum being rotatably adjustable for setting the machine helix angle of said stock removing tool,
      a work spindle housing located on said machine base, said work spindle housing comprising work holding means for rotatably mounting at least one workpiece thereon for rotation about its axis of rotation, means for simultaneously moving said tool housing and said work spindle housing relative to one another in mutually perpendicular directions (X,Y) whereby said at least one workpiece is traversed along a predetermined path relatively across said generally hourglass shape of said stock removing tool in a plane substantially perpendicular to the axis of rotation of said at least one workpiece.
   (b) providing a stock removing tool having a generally hourglass shape along the width thereof and at least one thread-like stock removing surface generally helically arranged and extending along said width, said at least one thread comprising a plurality of revolutions about said stock removing tool, said stock removing tool being conjugate along the width thereof with the tooth surfaces of a theoretical ring gear, said theoretical ring gear having a center, $X_I$, and a diameter,
   (c) providing a work gear having tooth surfaces and a diameter less than the diameter of said theoretical ring gear, the tooth surfaces of said work gear being internally conjugate with said tooth surfaces of said theoretical ring gear, said work gear having a center, $X_W$, and an axis of rotation passing through said center,
   (d) rotating said work gear about its axis of rotation,
   (e) rotating said stock removing tool about its axis of rotation, said theoretical ring gear rotating in mesh with said stock removing tool,
   (f) engaging said stock removing tool and said work gear, said center, $X_W$, of said work gear being located a distance spaced from said center, $X_I$, of said theoretical ring gear,
   (g) traversing said work gear in mesh relatively across said stock removing tool along said width thereof, said traversing being in a plane substantially perpendicular to said axis of rotation of said work gear, said relative traversing comprising rotating said work gear in mesh with the internal tooth surfaces of said theoretical ring gear and simultaneously moving said center, $X_W$, of said work gear along a path about the center, $X_I$, of said theoretical ring gear at said distance spaced therefrom, said tooth surfaces of said work gear remaining in mesh with said tooth surfaces of said theoretical ring gear as said work gear traverses relatively across said stock removing tool.

24. In a method of grinding spur and helical gears comprising the steps of:
   traversing a work gear, having an axis of rotation passing through the center thereof, across a grinding wheel having an axis of rotation and a width extending in the axial direction of said grinding wheel, said grinding wheel having a generally hourglass shape along said width and including at least one stock removing surface arranged generally helically about the periphery and extending along the width of said grinding wheel, the improvement comprising:
   providing said at least one stock removing surface with a continually changing surface profile whereby said surface profile is unique in any axial cross-section plane, and,
   traversing said work gear relatively across said width of said grinding wheel in a direction substantially perpendicular to the axis of rotation of said work gear whereby non-concave tooth surfaces are formed on said work gear.

25. The improved method of claim 24 wherein said traversing comprises:
   rotating said grinding wheel as though said grinding wheel were in mesh along said width with the outer tooth surfaces of a theoretical ring gear having an axis of rotation passing through the center thereof,
   rotating said work gear as though the tooth surfaces of said work gear were in mesh with the inner tooth surfaces of said theoretical ring gear, said theoretical ring gear having a diameter larger than the diameter of said work gear, and, substantially simultaneously with said rotating of said grinding wheel and said work gear,
   moving the center of said work gear along a path about said center of said theoretical ring gear whereby said work gear traverses in mesh relatively along said width of said grinding wheel.

* * * * *